US012784260B2

(12) United States Patent
Chen et al.

(10) Patent No.: US 12,784,260 B2
(45) Date of Patent: Nov. 3, 2026

(54) METHOD FOR UPDATING VISUAL POSITIONING PARAMETER, ELECTRONIC DEVICE, AND STORAGE MEDIUM

(71) Applicant: Beijing Zitiao Network Technology Co., Ltd., Beijing (CN)

(72) Inventors: Sili Chen, Beijing (CN); Hengkai Guo, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 75 days.

(21) Appl. No.: 18/877,606

(22) PCT Filed: Jun. 1, 2023

(86) PCT No.: PCT/CN2023/097896
§ 371 (c)(1),
(2) Date: Dec. 20, 2024

(87) PCT Pub. No.: WO2023/246468
PCT Pub. Date: Dec. 28, 2023

(65) Prior Publication Data

US 2025/0245850 A1 Jul. 31, 2025

(30) Foreign Application Priority Data

Jun. 24, 2022 (CN) ......................... 202210730417.8

(51) Int. Cl.
*G06T 7/70* (2017.01)
*G06T 19/00* (2011.01)

(52) U.S. Cl.
CPC .............. *G06T 7/70* (2017.01); *G06T 19/006* (2013.01); *G06T 2207/30244* (2013.01)

(58) Field of Classification Search
CPC ......... G06T 7/70; G06T 19/006; G06T 19/00; G06T 19/003; G06T 19/20; G06T 15/00;
(Continued)

(56) References Cited

U.S. PATENT DOCUMENTS 11,276,201 B1 3/2022 Garcia Sopo et al.
12,008,722 B2 * 6/2024 Wan ....................... B60K 35/10
(Continued)

FOREIGN PATENT DOCUMENTS

CN 110136199 A 8/2019
CN 111426316 A 7/2020
(Continued)

OTHER PUBLICATIONS

ISA China National Intellectual Property Administration, International Search Report and Written Opinion Issued in Application No. PCT/CN2023/097896, Jul. 24, 2023, WIPO, 14 pages.
Andrew Jankenpan, "ORB—SLAM2 Source Code 09—SIM(3) Algorithm," CSDN, Available Online at https://blog.csdn.net/qq_44047943/article/details/115305419, Apr. 12, 2021, 14 pages.
(Continued)

*Primary Examiner* — Vijay Shankar
(74) *Attorney, Agent, or Firm* — Alleman Hall LLP

(57) ABSTRACT

A method for updating a visual positioning parameter, an electronic device, and a computer-readable storage medium are provided. The method includes: obtaining a first pose mapping based on first pose information and second pose information of a terminal device at a first time, where the first pose information represents an estimated pose of the terminal device which is obtained based on a real-time tracking algorithm, and the second pose information represents an actual pose of the terminal device which is obtained based on a visual positioning service; obtaining a first target duration based on a synchronization interval parameter, and after the first target duration, obtaining a second pose mapping based on first pose information and second pose information of the terminal device at a second time; and updating the synchronization interval parameter based on the amount of deviation between the first pose mapping and the second pose mapping.

20 Claims, 7 Drawing Sheets

(58) Field of Classification Search

CPC ..... G06T 15/005; G06T 15/10; G06T 15/205; G06T 17/00; G06T 17/05; G06T 2207/30244; G06F 9/445; G06F 9/44505; G06V 20/10

See application file for complete search history.

(56) References Cited

U.S. PATENT DOCUMENTS

| | | | | |
|---|---|---|---|---|
| 12,366,459 | B2 * | 7/2025 | Streem | G01C 21/005 |
| 12,367,636 | B2 * | 7/2025 | Chakraborty | G06T 7/80 |
| 12,621,246 | B2 * | 5/2026 | Ma | G06T 7/70 |
| 2023/0400327 | A1 * | 12/2023 | Streem | G01C 21/005 |
| 2025/0124671 | A1 * | 4/2025 | Ramani | G06V 10/764 |
| 2025/0219959 | A1 * | 7/2025 | Ma | G06T 7/70 |
| 2026/0105712 | A1 * | 4/2026 | Jia | G06T 19/20 |

FOREIGN PATENT DOCUMENTS

| | | | |
|---|---|---|---|
| CN | 112815923 | A | 5/2021 |
| CN | 113029128 | A | 6/2021 |
| CN | 113409391 | A | 9/2021 |
| CN | 113850911 | A | 12/2021 |
| CN | 113884006 | A | 1/2022 |

OTHER PUBLICATIONS

Decode, “The Key to the Popularization of AR: Challenges and Prospects of Visual SLAM,” PingWest, Available Online at https://www.pingwest.com/a/196831, Nov. 1, 2019, 21 pages.

China National Intellectual Property Administration, Office Action and Search Report Issued in Application No. 202210730417.8, Apr. 29, 2026, 17 pages.

* cited by examiner

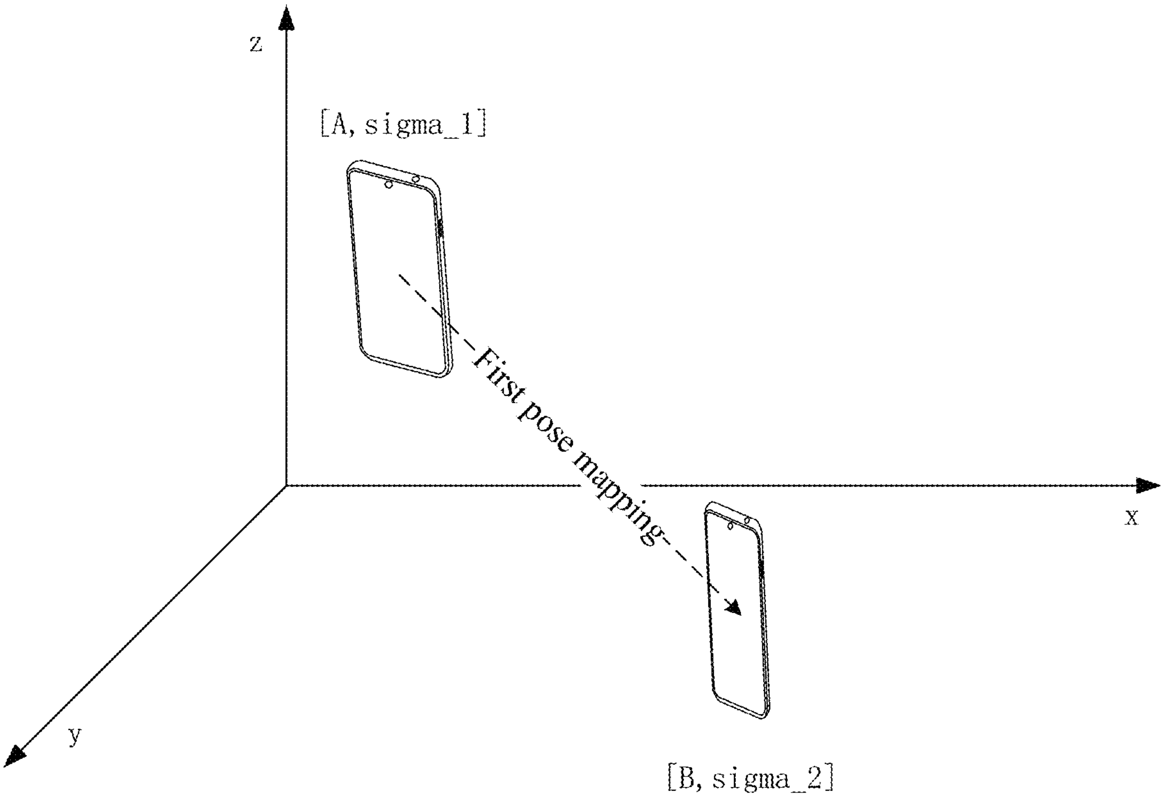

Fig. 4

S101A

Obtain first pose information of a terminal device at a third time

S101B

Superimpose a first pose mapping onto the first pose information of the terminal device at the third time to generate output pose information, where the output pose information represents a real-time pose of the terminal device which is obtained based on a real-time tracking algorithm and a visual positioning service at the third time

Fig. 5

METHOD FOR UPDATING VISUAL POSITIONING PARAMETER, ELECTRONIC DEVICE, AND STORAGE MEDIUM

CROSS-REFERENCE TO RELATED APPLICATION

This is a national stage application filed under 37 U.S.C. 371 based on International Patent Application No. PCT/CN2023/097896, filed on Jun. 1, 2023, which claims priority to Chinese Patent Application No. 202210730417.8 filed on Jun. 24, 2022, the disclosures of which are incorporated herein by reference in their entireties.

TECHNICAL FIELD

Embodiments of the present disclosure relate to the technical field of machine vision, and in particular to a method and apparatus for updating a visual positioning parameter, an electronic device, a computer-readable storage medium, a computer program product, and a computer program.

BACKGROUND

Visual positioning service (VPS), also known as visual positioning system technology, is a visual effect technology that enables the overlay of virtual content on real-world physical scenes. In contrast to other scenes (such as faces, limbs and small commodities), the visual positioning service focuses mainly on large-scale scenes, such as shopping malls, streets, parks and even city-level scenes, thus achieving the effect of large-scale virtual interactive spaces.

In the related art, in a scenario where the visual positioning service is applied to a mobile terminal scenario, a mobile terminal device requires the combination of a locally executed pose tracking algorithm and the visual positioning service to achieve precise pose positioning of the terminal device.

However, accessing the visual positioning service requires consumption of server network and computational resources. As the calling volume of the visual positioning service increases, the problems of high computing load and high network load on the server providing the visual positioning service arise, thus affecting the real-time responsiveness and the stability of the visual positioning service.

SUMMARY

Embodiments of the present disclosure provide a method and apparatus for updating a visual positioning parameter, an electronic device, a computer-readable storage medium, a computer program product, and a computer program.

In a first aspect, an embodiment of the present disclosure provides a method for updating a visual positioning parameter. The method is applied to a terminal device, and includes:

obtaining a first pose mapping based on first pose information and second pose information of the terminal device at a first time, where the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device; obtaining a first target duration based on a synchronization interval parameter, and after the first target duration, obtaining a second pose mapping based on first pose information and second pose information of the terminal device at a second time, where the second pose mapping represents a mapping relationship between an estimated pose and an actual pose at the second time; and updating the synchronization interval parameter based on the amount of deviation between the first pose mapping and the second pose mapping, where the synchronization interval parameter is used for determining a time interval between two instances of visual positioning of the terminal device.

In a second aspect, an embodiment of the present disclosure provides an apparatus for updating a visual positioning parameter. The apparatus includes:

a first obtaining module, which is configured to obtain a first pose mapping based on first pose information and second pose information of a terminal device at a first time, where the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device;

a second obtaining module, which is configured to obtain a first target duration based on a synchronization interval parameter, and after the first target duration, obtain a second pose mapping based on first pose information and second pose information of the terminal device at a second time, where the second pose mapping represents a mapping relationship between an estimated pose and an actual pose at the second time; and an update module, which is configured to update the synchronization interval parameter based on the amount of deviation between the first pose mapping and the second pose mapping, where the synchronization interval parameter is used for determining a time interval between two instances of visual positioning of the terminal device.

In a third aspect, an embodiment of the present disclosure provides an electronic device. The electronic device includes:

a processor, and a memory in communication connection with the processor, where the memory stores computer-executable instructions; and the processor executes the computer-executable instructions stored in the memory to implement the method for updating a visual positioning parameter as described in the first aspect and various possible designs of the first aspect.

In a fourth aspect, an embodiment of the present disclosure provides a computer-readable storage medium, where the computer-readable storage medium stores computer-executable instructions that, when executed by a processor, cause the method for updating a visual positioning parameter as described in the first aspect and various possible designs of the first aspect to be implemented.

In a fifth aspect, an embodiment of the present disclosure provides a computer program product including a computer program that, when executed by a processor, causes the method for updating a visual positioning parameter as described in the first aspect and various possible designs of the first aspect to be implemented.

In a sixth aspect, an embodiment of the present disclosure provides a computer program that, when executed by a processor, causes the method for updating a visual positioning parameter as described in the first aspect and various possible designs of the first aspect to be implemented.

Embodiments of the present disclosure provide a method and apparatus for updating a visual positioning parameter, and an electronic device, a computer-readable storage medium, a computer program product and a computer program. The method includes: obtaining a first pose mapping based on first pose information and second pose information of a terminal device at a first time, where the first pose information represents an estimated pose of the terminal device which is obtained based on a real-time tracking algorithm, the second pose information represents an actual pose of the terminal device which is obtained based on a visual positioning service, and the first pose mapping represents a mapping relationship between the estimated pose and the actual pose at the first time; obtaining a first target duration based on a synchronization interval parameter, and after the first target duration, obtaining a second pose mapping based on first pose information and second pose information of the terminal device at a second time, where the second pose mapping represents a mapping relationship between an estimated pose and an actual pose at the second time; and updating the synchronization interval parameter based on the amount of deviation between the first pose mapping and the second pose mapping.

BRIEF DESCRIPTION OF DRAWINGS

In order to more clearly describe the technical solutions in the embodiments of the present disclosure or in the related art, the accompanying drawings for describing the embodiments or the related art will be briefly described below. Apparently, the accompanying drawings in the description below show some embodiments of the present disclosure, and persons of ordinary skill in the art may still derive other accompanying drawings from these accompanying drawings without creative efforts.

FIG. 4 is a schematic diagram of a first pose mapping according to an embodiment of the present disclosure.

FIG. 5 is a schematic flowchart of the step of generating output pose information.

DETAILED DESCRIPTION

In order to make the objects, technical solutions and advantages of embodiments of the present disclosure clearer, the technical solutions in the embodiments of the present disclosure will be described clearly and completely below with reference to the accompanying drawings in the embodiments of the present disclosure. Obviously, the embodiments described are some of, rather than all of, the embodiments of the present disclosure. All the other embodiments obtained by those of ordinary skill in the art based on the embodiments of the present disclosure without any creative effort shall fall within the scope of protection of the present disclosure.

The application scenarios of embodiments of the present disclosure are explained below:

the method for updating a visual positioning parameter provided in an embodiment of the present disclosure may be applied in visual positioning technology for a mobile terminal; the visual positioning technology for a mobile terminal may realize applications based on augmented reality (AR) technology, such as the positioning of outdoor buildings and streets, and special-effect rendering; and more particularly, the visual positioning technology for a mobile terminal may be applied in specific application scenarios, such as AR map navigation and AR building reconstruction.

Figure 1:
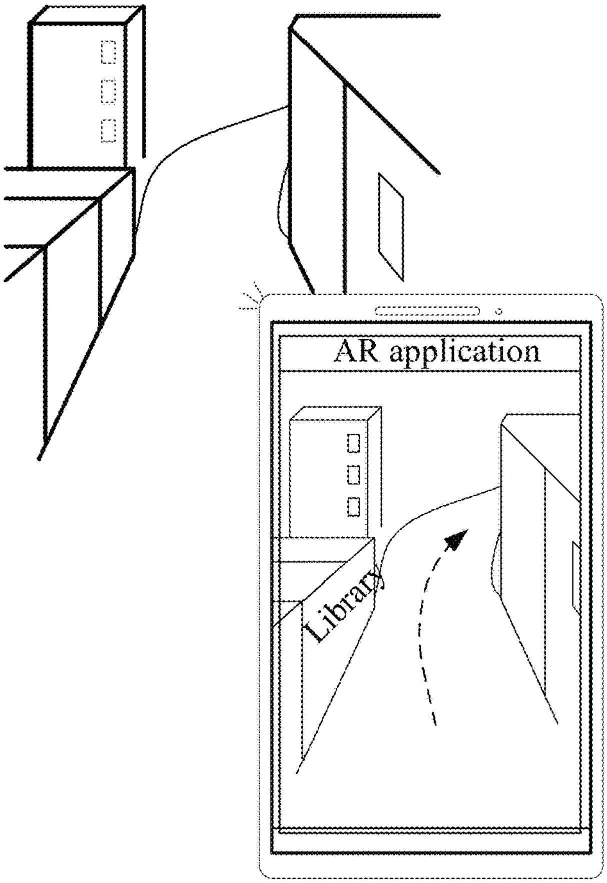
FIG. 1 is a diagram of an application scenario of visual positioning technology for a mobile terminal according to an embodiment of the present disclosure.

FIG. 1 is a diagram of an application scenario of visual positioning technology for a mobile terminal according to an embodiment of the present disclosure. Specifically, as shown in FIG. 1, a mobile terminal is, for example, a smartphone shown in the figure. The smartphone runs an AR application (APP) to capture an image by a camera, and processes the image by calling a visual positioning service provided by a server, to obtain an augmented reality image, where the augmented reality image includes special effects for a native image, such as an “arrow” shown in the figure for indicating a direction, and information (for example, the word “library” shown in the figure) for introducing the name of a building, such that the functions, such as AR map navigation, are achieved.

Figure 2:
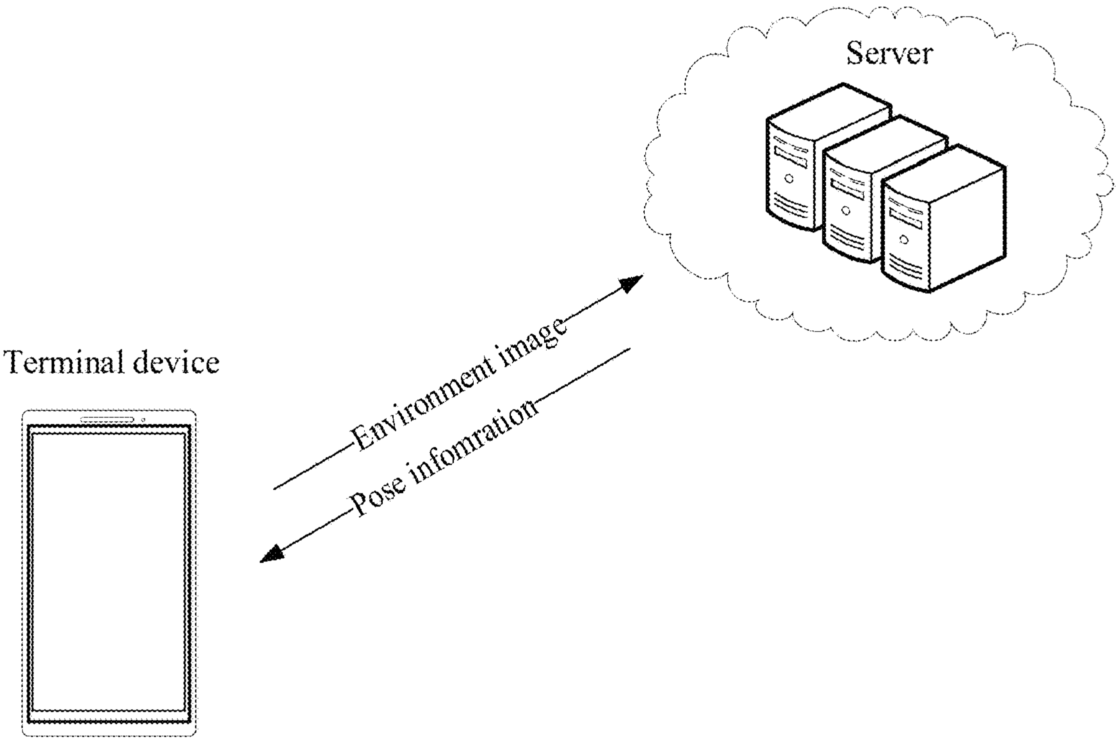
FIG. 2 is a schematic diagram of a system architecture according to an embodiment of the present disclosure.

FIG. 2 is a schematic diagram of a system architecture according to an embodiment of the present disclosure. With reference to FIG. 2 and the schematic diagram of an application scenario shown in FIG. 1, a mobile terminal device is in communication connection with a server that provides a visual positioning service. After obtaining, by a camera, an environment image that describes the current environment, the mobile terminal device uploads the environment image to the server for processing. The server pre-stores a high-precision map of this region, and after making a comparison and performing calculation based on the environment image and the high-precision map uploaded by the mobile terminal device, the server returns to the mobile terminal device pose information used for representing the position and angle of the mobile terminal device. The mobile terminal device determines the specific position of a special effect based on the pose information and performs special-effect rendering, such that the technical purpose of augmented reality display is achieved.

However, during an actual application process, the mobile terminal device is in a moving state (for example, an AR navigation application scenario), and needs to constantly acquire camera images and send the camera images to the server for processing. This requires continuous occupation of corresponding server resources and network resources. Limited by actual application conditions, the server cannot process, at a high frequency, the camera images uploaded by the mobile terminal device. Thus, in the related art, the mobile terminal device usually calls the visual positioning service at a fixed time interval based on a fixed synchronization interval parameter, and uploads the camera images. For example, the visual positioning service is called once every five seconds. After the pose information returned by the server is received and before the visual positioning service is called next time, the position and angle of the mobile terminal device are predicted by means of a real-time tracking algorithm that is run locally, thereby achieving the purpose of real-time and continuous special-effect rendering.

With regard to the above related art, the inventors found that even if the fixed synchronization interval parameter is taken as a basis, the problems of high computing load and high network load of the server that provides the visual positioning service still arise, thereby affecting the real-time responsiveness and the stability of the visual positioning service, and the problems of augmented reality display being lagging and not responding in a timely manner, etc. arise on the side of the mobile terminal device.

An embodiment of the present disclosure provides a method for updating a visual positioning parameter to solve the above problems.

Figure 3:
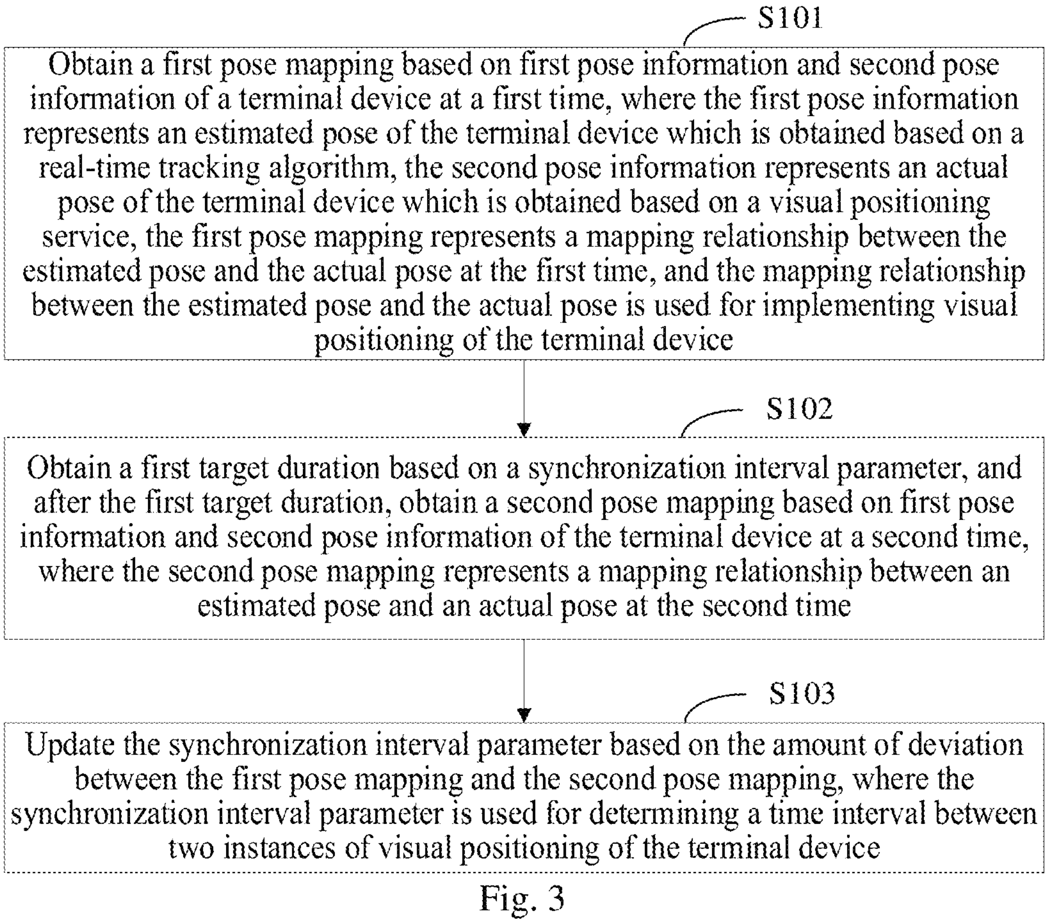
FIG. 3 is a first schematic flowchart of a method for updating a visual positioning parameter according to an embodiment of the present disclosure.

With reference to FIG. 3, FIG. 3 is a first schematic flowchart of a method for updating a visual positioning parameter according to an embodiment of the present disclosure. The method of this embodiment may be applied to a terminal device, and the method for updating a visual positioning parameter includes the following steps.

Step S101: Obtain a first pose mapping based on first pose information and second pose information of a terminal device at a first time, where the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device.

For example, an execution body of the method for updating a visual positioning parameter provided in this embodiment may be a terminal device, in particular, for example, a smartphone. The terminal device is provided with an image acquisition unit, e.g. a camera, and the camera takes a picture or records a video to obtain an environment image that represents an environment surrounding the terminal device. Further, the real-time tracking algorithm that is executed locally at the terminal device is called based on the environment image to obtain the first pose information representing the estimated pose of the terminal device; and the visual positioning service that is executed at a server is called based on the environment image to obtain the second pose information representing the actual pose of the terminal device. The pose information may include angle information that represents a rotation angle of the terminal device and position information that represents the position of the terminal device. The pose information can be realized by three directions and three rotation angles in a three-dimensional space (6-degrees-of-freedom (6DoF) representation).

For example, the real-time tracking algorithm is an algorithm used for estimating the pose of a terminal device in real time based on an environment image, and is more specifically, for example, a simultaneous localization and mapping (SLAM) algorithm, a concurrent mapping and localization (CML) algorithm, etc. The implementation principle of the real-time tracking algorithm is to make an execution object (the terminal device in this embodiment) move from an unknown position, position the execution object itself based on an environment image acquired during the movement process, and also construct an incremental map based on the positioning of the execution object itself, thereby realizing autonomous positioning and navigation of the execution object. The environment image acquired by the camera is processed, for example, by means of the simultaneous localization and mapping algorithm, such that corresponding first pose information having 6DoF can be obtained, where the first pose information may be represented by a multi-dimensional matrix. The specific implementation processes of real-time tracking algorithms, such as the simultaneous localization and mapping algorithm, are the related art. Details are not described herein again.

For example, the VPS is an algorithm used for obtaining the specific position and angle of a terminal device based on a comparison between a high-precision map preset in a server and an environment image uploaded by the terminal device. Owing to the high-precision map preset in the server, the high-precision positioning of the terminal device can be implemented. Therefore, compared with the estimated pose obtained based on the real-time tracking algorithm, a more accurate actual pose of the terminal device, i.e. the second pose information, can be obtained based on the visual positioning service. Similarly, the second pose information also has 6DoF, and may be represented by a multi-dimensional matrix. The specific implementation principle of the visual positioning service is also the related art known to a person skilled in the art. Details are not described herein again.

After the first pose information output by means of the real-time tracking algorithm and the second pose information output by means of the visual positioning service are obtained, the first pose information is aligned with the second pose information, and the mapping relationship between the two is solved to obtain the first pose mapping that represents the mapping relationship between the two. The first pose mapping represents a fixed deviation between the estimated pose of the terminal device which is estimated by the real-time tracking algorithm at the first time and the actual pose of the terminal device which is obtained by the visual positioning service at the first time.

FIG. 4 is a schematic diagram of a first pose mapping according to an embodiment of the present disclosure. As shown in FIG. 4, based on an estimated pose corresponding to first pose information, a terminal device is located at a position A and has an angle of sigma_1 (shown in the figure as [A, sigma_1]), where A includes three coordinate values (x1, y1, z1) representing a spatial position, and sigma_1 includes three angle values rx1, ry1 and rz1 representing rotation angles on three coordinate axes x, y and z in a three-dimensional space. Based on an actual pose corresponding to second pose information, the terminal device is located at a position B and has an angle of sigma_2 (shown in the figure as [B, sigma_2]), where B includes three coordinate values (x2, y2, z2) representing a spatial position, and sigma_2 includes three angle values rx2, ry2 and rz2 representing rotation angles on the three coordinate axes x, y and z in the three-dimensional space. The information representing a mapping relationship between [A, sigma_1] and [B, sigma_2] is a first pose mapping. That is, based on the first pose mapping, mutual conversion between the first pose information and the second pose information can be implemented.

Further, since first pose information may be obtained in real time, at a next moment in time, first pose information obtained in real time at the next moment in time is compensated for based on the first pose mapping to obtain the pose of a terminal device that corresponds to the next moment in time, such that a real-time pose of the terminal device is obtained without calling a visual positioning service.

Optionally, as shown in FIG. 5, after step S101, the step of generating output pose information specifically includes the following steps.

Step S101A: Obtain first pose information of a terminal device at a third time.

Step S101B: Superimpose a first pose mapping onto the first pose information of the terminal device at the third time to generate output pose information, where the output pose information represents a real-time pose of the terminal device which is obtained based on a real-time tracking algorithm and a visual positioning service at the third time.

For example, the third time is a moment in time after the first time, and the interval between the third time and the first time may be a preset sampling interval. That is, the third time may be understood as a next moment in time after the first time. At the third time, the first pose information at the third time is obtained by acquiring a real-time environment image and calling the real-time tracking algorithm that is run locally at the terminal device. The specific implementation process thereof is similar to that of obtaining the first pose information at the first time in step S101, and details are not described herein again. Then, the first pose mapping is superimposed onto the first pose information of the terminal device at the third time to obtain the output pose information. The output pose information represents a calculated pose, which is obtained by the terminal device based on a real-time estimated pose and the first pose mapping that is obtained by calling the visual positioning service last time. The calculated pose is used to determine a special-effect pose, thereby achieving the purpose of augmented reality display. This process is equivalent to compensation for the first pose information, and thus the position and angle of the terminal device estimated based on the first pose information are consistent with an actual position and angle of the terminal device, such that the real-time pose of the terminal device is obtained without calling the visual positioning service.

Figure 6:
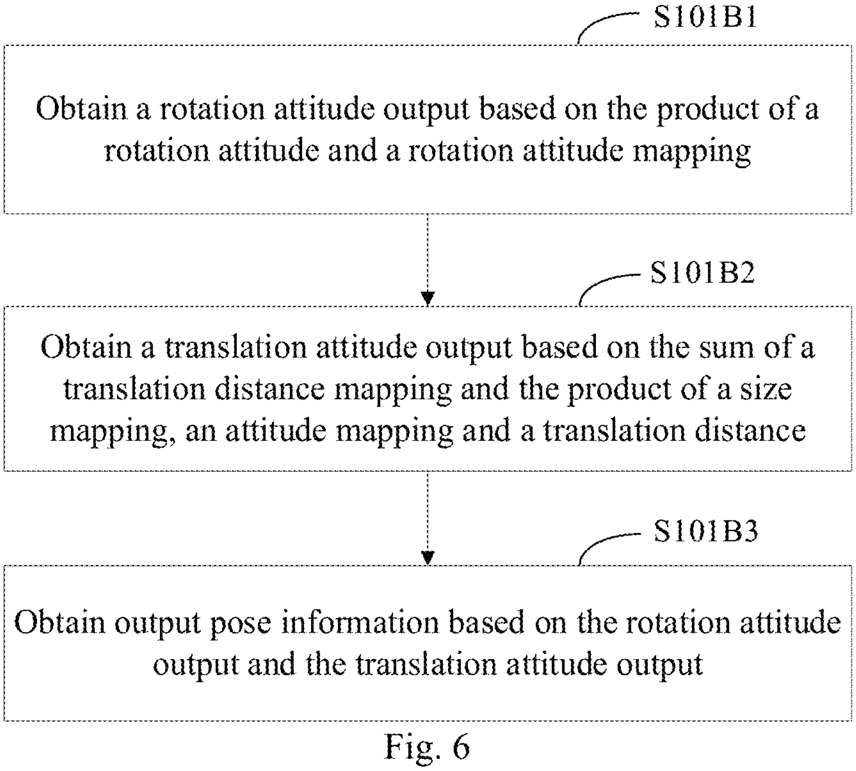
FIG. 6 is a schematic flowchart of step S101B in the embodiment shown in FIG. 5.

In a possible implementation, the first pose mapping includes an attitude mapping and a size mapping, the attitude mapping includes a rotation attitude mapping and a translation distance mapping, and the first pose information includes a rotation attitude and a translation distance. As shown in FIG. 6, the specific implementation steps of step S101B are as follows.

Step S101B1: Obtain a rotation attitude output based on the product of a rotation attitude and a rotation attitude mapping.

Step S101B2: Obtain a translation attitude output based on the sum of a translation distance mapping and the product of a size mapping, an attitude mapping and a translation distance.

Step S101B3: Obtain output pose information based on the rotation attitude output and the translation attitude output.

For example, the size mapping represents a proportional relationship between the size of a target object which is obtained by the terminal device based on the real-time tracking algorithm and the size of the target object which is obtained by the terminal device based on the visual positioning service. Taking the same circular object located in the environment image as an example, the diameter of the circular object which is obtained based on the real-time tracking algorithm is 2, the diameter of the circular object which is obtained based on the visual positioning service is 4, and thus the size mapping is 2 (or ½, which can be determined based on the specific implementation, and the same below). The rotation attitude mapping in the attitude mapping represents a mapping between a terminal angle obtained by the terminal device based on the real-time tracking algorithm and a terminal angle obtained by the terminal device based on the visual positioning service; and the translation distance mapping in the attitude mapping represents a mapping between a terminal position obtained by the terminal service based on the real-time tracking algorithm and a terminal position obtained by the terminal service based on the visual positioning service. The rotation attitude mapping and the translation distance mapping are implemented by matrices.

First, the mapping of the rotation attitude is implemented based on a dot product of the rotation attitude and the rotation attitude mapping to obtain the rotation attitude output. Then, the rotation attitude and the translation distance included in the first pose information are respectively processed based on the attitude mapping and the size mapping, a point product of the size mapping, the attitude mapping and the translation distance is calculated to obtain a first result, and the sum of the first result and the translation distance mapping is then calculated by taking the translation distance mapping as a distance deviation value, such that the translation attitude output can be obtained. Based on the translation attitude output and the rotation attitude output, the output pose information can be obtained, and by taking the output pose information as six-degrees-of-freedom coordinates, the position and angle of the terminal device can be precisely positioned, thereby achieving the purpose of subsequent special-effect positioning and rendering.

Step S102: Obtain a first target duration based on a synchronization interval parameter, and after the first target duration, obtain a second pose mapping based on first pose information and second pose information of the terminal device at a second time, where the second pose mapping represents a mapping relationship between an estimated pose and an actual pose at the second time.

For example, in step S101, after a corresponding first pose mapping is obtained based on the first pose information and second pose information obtained at the first time, real-time position estimation within a period of time can be implemented based on the first pose mapping; when the second time is reached after the first target duration, the visual positioning service is called again to obtain the second pose information at the second time, and the first pose information at the second time is obtained by means of the real-time tracking algorithm that is executed locally; and then a corresponding second pose mapping can be obtained based on the first pose information and second pose information at the second time. Further, after the first pose information at the second time and the second pose mapping are obtained, at a certain time after the second time, for example, a fourth time after the second time, output pose information of the terminal device at the fourth time can be obtained based on first pose information at the fourth time and the second pose mapping, thereby implementing augmented reality display at the fourth time.

The steps of obtaining first pose information and second pose information at a second time and obtaining a second pose mapping based on the first pose information and the second pose information are similar to the process of obtaining first pose information and second pose information at a first time and a first pose mapping in step S101. Details are not described herein again.

For example, the first target duration in the above step is a time length determined based on the synchronization interval parameter. For example, the longer the first target duration represented based on the synchronization interval parameter, the longer the interval at which the server is accessed to call the visual positioning service, the smaller the computing load and network load for the server, and the less accurate the output pose information obtained by the terminal device; otherwise, the larger the computing load and network load for the server, and the more accurate the output pose information obtained by the terminal device.

Step S103: Update the synchronization interval parameter based on the amount of deviation between the first pose mapping and the second pose mapping, where the synchronization interval parameter is used for determining a time interval between two instances of visual positioning of the terminal device.

For example, a pose mapping calculated based on first pose information and second pose information is a static mapping obtained based on a frame of image at a specific time (for example, the first time or the second time). Therefore, in a case where the terminal device is in a stationary state, for example, the terminal device is always in the stationary state between the first time and the second time, the output pose information obtained based on the first pose mapping after the first time is highly accurate. However, in an actual application scenario, the terminal device is usually in a moving state (including position movement and angular rotation), and in this case, the accuracy of the output pose information obtained based on the first pose mapping after the first time gradually decreases in a non-linear manner as a movement distance and a rotation angle of the terminal device increases. Therefore, it is necessary to call the visual positioning service again after a certain time to obtain a new pose mapping, thereby ensuring the accuracy of the output pose information.

For the above reasoning, the synchronization interval parameter may be updated based on the amount of deviation between the first pose mapping and the second pose mapping, thereby balancing a relationship between the accuracy of the output pose information and the computing load of the server.

In a possible implementation, if the amount of deviation between the first pose mapping and the second pose mapping is less than a preset deviation threshold, the first target duration is updated to a second target duration, where the second target duration is greater than the first target duration; and if the amount of deviation between the first pose mapping and the second pose mapping is greater than the deviation threshold, the first target duration is updated to a third target duration, where the third target duration is less than or equal to the first target duration.

Specifically, when the amount of deviation between the first pose mapping and the second pose mapping is small, it is indicated that the terminal device is in a state of relatively stationary (e.g. moving at a low and constant speed but not rotating, not moving but rotating at a low and constant speed, and moving at a low and constant speed and rotating at a low and constant speed), and in this case, the accuracy of the output pose information obtained by the terminal device reduces a little. Thus, it is possible to increase an interval duration corresponding to the first target duration by updating the synchronization interval parameter, and increase the interval at which the server is accessed to call the visual positioning service, thereby reducing the load of the server while ensuring the accuracy of the output pose information. Otherwise, when the amount of deviation between the first pose mapping and the second pose mapping is large, it is indicated that the terminal device is in a state of rapidly changing, and in this case, the accuracy of the output pose information obtained by the terminal device reduces a lot. Thus, it is possible to decrease the interval duration corresponding to the first target duration by updating the synchronization interval parameter, and reduce the interval at which the server is accessed to call the visual positioning service, thereby improving the accuracy of the output pose information.

Figure 7:
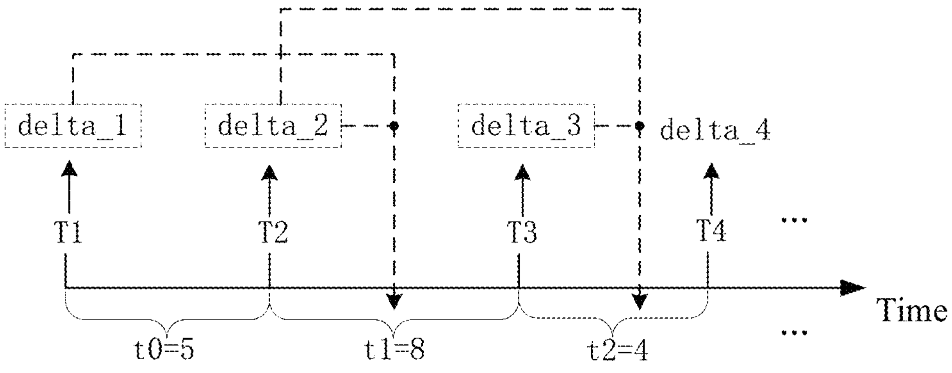
FIG. 7 is a schematic diagram of an update of a synchronization interval parameter according to an embodiment of the present disclosure.

FIG. 7 is a schematic diagram of an update of a synchronization interval parameter according to an embodiment of the present disclosure. The process of updating a synchronization interval parameter is described in more detail below with reference to FIG. 7.

At a first time T1, the terminal device sends a positioning request to the visual positioning service based on an environment image acquired in real time, and obtains a first pose mapping delta_1 based on the real-time tracking algorithm that is run locally. Then, the terminal device moves, acquires an environment image again based on an initial synchronization interval parameter (t0=5) at a second time T2 after five seconds, sends a positioning request to the visual positioning service, and obtains a second pose mapping delta_2 based on the real-time tracking algorithm that is run locally. The terminal device updates the initial synchronization interval parameter (t0=5) to a first synchronization interval parameter (t1=8) based on the value of deviation between delta_1 and delta_2. After that, the terminal device moves again, acquires an environment image again based on the first synchronization interval parameter (t1=8) at a third time T3 after eight seconds, sends a positioning request to the visual positioning service again, and obtains a second pose mapping delta_3 based on the real-time tracking algorithm that is run locally. Thereafter, based on the specific situation, the first synchronization interval parameter may continue to be further updated (t2=4) based on the value of deviation between delta_2 and delta 3, and the terminal device sends a positioning request to the visual positioning service at a fourth time T4 after four seconds, to obtain a second pose mapping delta_4. The above steps are repeated again and again until the specific process of augmented reality display is completed.

In this embodiment, a first pose mapping is obtained based on first pose information and second pose information of a terminal device at a first time, where the first pose information represents an estimated pose of the terminal device which is obtained based on a real-time tracking algorithm, the second pose information represents an actual pose of the terminal device which is obtained based on a visual positioning service, and the first pose mapping represents a mapping relationship between the estimated pose and the actual pose at the first time; a first target duration is obtained based on a synchronization interval parameter, and after the first target duration, a second pose mapping is obtained based on first pose information and second pose information of the terminal device at a second time, where the second pose mapping represents a mapping relationship between an estimated pose and an actual pose at the second time; and the synchronization interval parameter is updated based on the amount of deviation between the first pose mapping and the second pose mapping. During the process of continuous visual positioning, a deviation comparison is made based on a first pose mapping obtained during the process of first visual positioning and a second pose mapping obtained during the process of second visual positioning, and a synchronization interval parameter that represents a time interval between the two instances of visual positioning is updated based on an obtained amount of deviation, such that the synchronization interval parameters is dynamically adjusted. In the case of different amounts of deviation, different time intervals are used to call the visual positioning service, thereby avoiding the problems of high computing load and high network load of the server caused by excessively frequent calling of the visual positioning service, and improving the real-time responsiveness and the stability of the visual positioning service.

Figure 8:
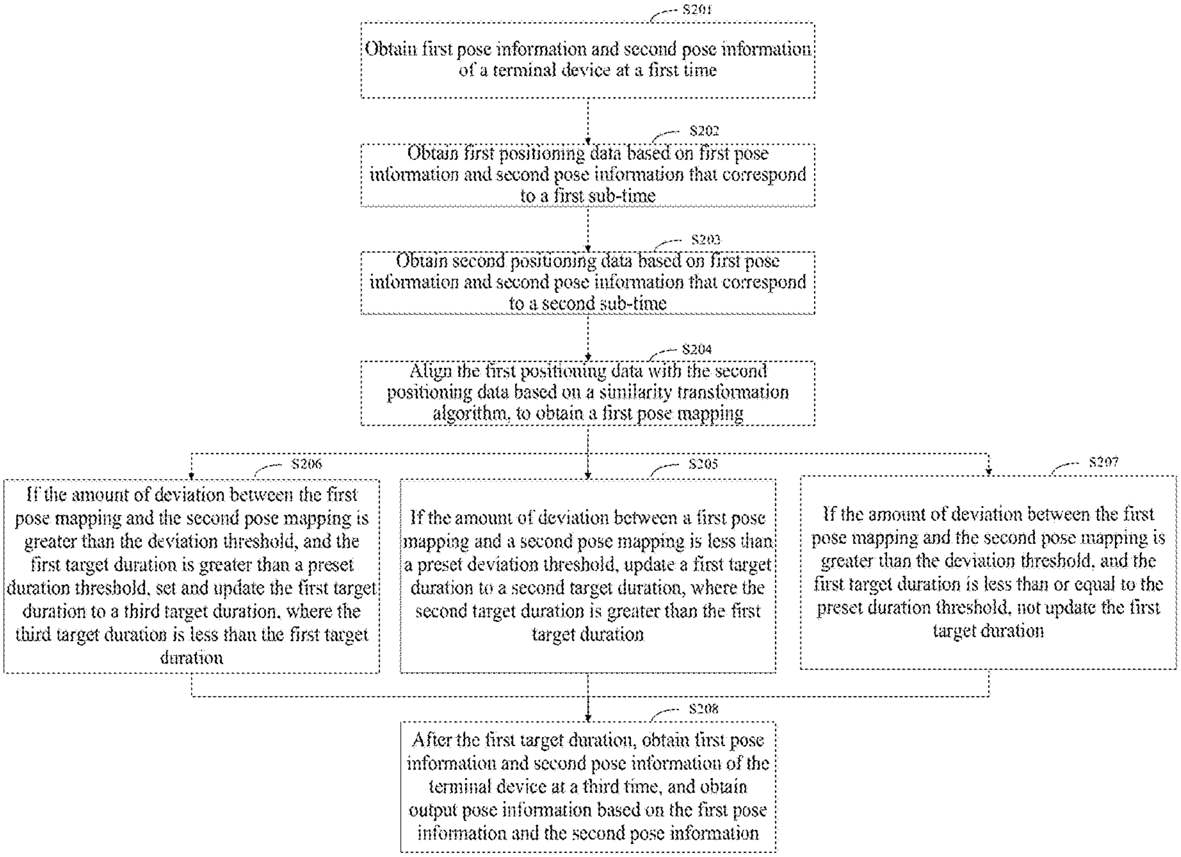
FIG. 8 is a second schematic flowchart of a method for updating a visual positioning parameter according to an embodiment of the present disclosure.

With reference to FIG. 8, FIG. 8 is a second schematic flowchart of a method for updating a visual positioning parameter according to an embodiment of the present disclosure. Based on the embodiment shown in FIG. 3, this embodiment further refines the step of updating a synchronization interval parameter. The method for updating a visual positioning parameter includes the following steps.

Step S201: Obtain first pose information and second pose information of a terminal device at a first time.

Figure 9:
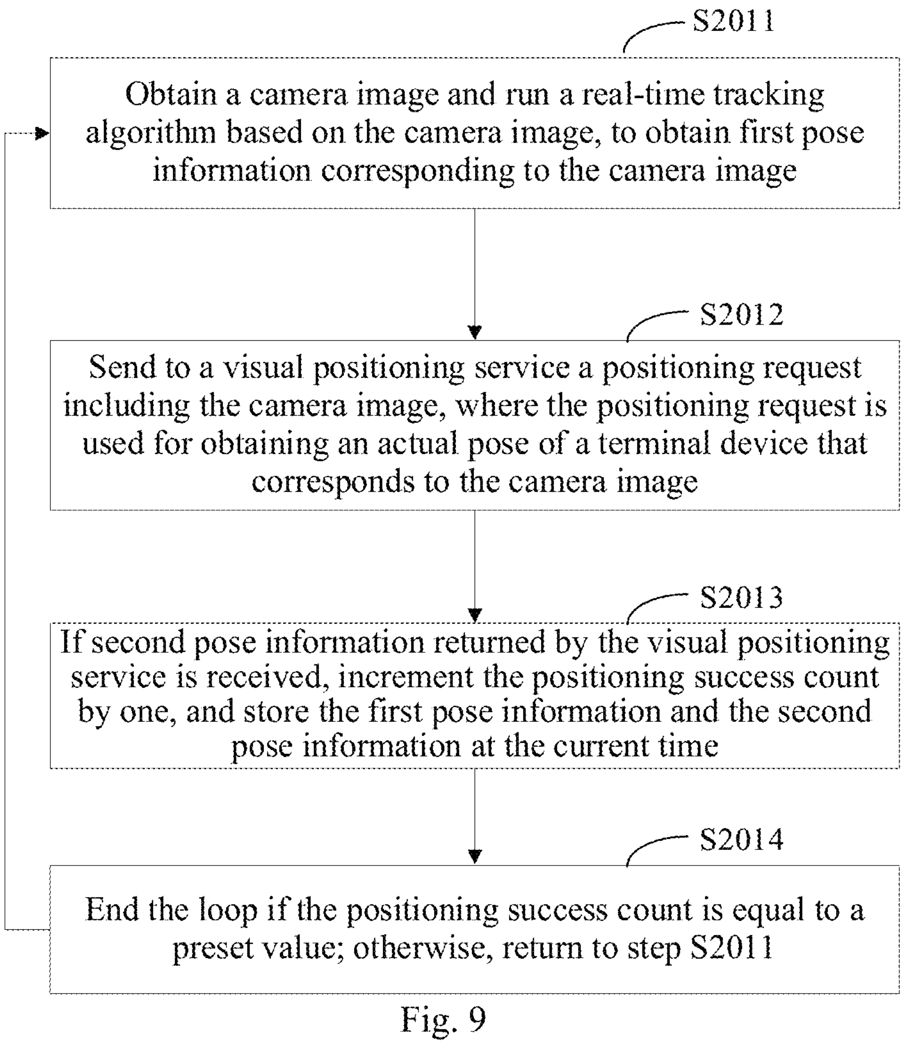
FIG. 9 is a schematic flowchart of step S201 in the embodiment shown in FIG. 8.

For example, the first time includes at least a first sub-time and a second sub-time after the first sub-time. As shown in FIG. 9, the specific implementation steps of step S201 are as follows.

Step S2011: Obtain a camera image and run a real-time tracking algorithm based on the camera image, to obtain first pose information corresponding to the camera image.

Step S2012: Send to a visual positioning service a positioning request including the camera image, where the positioning request is used for obtaining an actual pose of a terminal device that corresponds to the camera image.

Step S2013: If second pose information returned by the visual positioning service is received, increment the positioning success count by one, and store the first pose information and the second pose information at the current time.

Step S2014: End the loop if the positioning success count is equal to a preset value; otherwise, return to step S2011.

For example, during the process of calling the visual positioning service, due to the randomness of an environment image captured by a camera, there is a possibility that the problem whereby the visual positioning service cannot achieve the positioning of the terminal device based on an uploaded environment image arises, that is, the environment image cannot be successfully subjected to identification. In this embodiment, based on the above-mentioned steps, the visual positioning service is called at least twice by sending positioning requests at different times; if second pose information returned by the visual positioning service is received, it is indicated that environment image identification is successful, and then first pose information and second pose information at a sub-time are stored; and after second pose information is successfully obtained at least twice, the loop is ended, such that at least two groups of corresponding first pose information and second pose information are obtained. Then, the subsequent calculation of the first pose mapping is performed based on the at least two groups of first pose information and second pose information, thereby improving the accuracy of obtained output pose information.

Step S202: Obtain first positioning data based on first pose information and second pose information that correspond to a first sub-time.

Step S203: Obtain second positioning data based on first pose information and second pose information that correspond to a second sub-time.

Step S204: Align the first positioning data with the second positioning data based on a similarity transformation algorithm, to obtain a first pose mapping.

The similarity transformation (also referred to as Sim3) algorithm is an algorithm used for solving a similar transformation between two coordinate systems. Based on the principle of the Sim3 algorithm, as long as the coordinates of three pairs of matched non-collinear three-dimensional points in two coordinate systems are obtained, the similar transformation can be solved. The alignment between the first positioning data (corresponding to a first coordinate system) and the second positioning data (corresponding to a second coordinate system) is performed based on the Sim3 algorithm, which is equivalent to the process of calculating rotation, translation and scale factors between the first positioning data and the second positioning data. Thus, a rotation coefficient, a translation coefficient and a scale factor can be obtained. The three are respectively equivalent to the rotation attitude mapping, the translation distance mapping and the size mapping in the embodiment shown in FIG. 5. The specific implementation process of the similar transformation algorithm is the related art, and details are not described herein again.

Step S205: If the amount of deviation between a first pose mapping and a second pose mapping is less than a preset deviation threshold, update a first target duration to a second target duration, where the second target duration is greater than the first target duration.

Step S206: If the amount of deviation between the first pose mapping and the second pose mapping is greater than the deviation threshold, and the first target duration is greater than a preset duration threshold, set and update the first target duration to a third target duration, where the third target duration is less than the first target duration.

Step S207: If the amount of deviation between the first pose mapping and the second pose mapping is greater than the deviation threshold, and the first target duration is less than or equal to the preset duration threshold, not update the first target duration.

The not updating the first target duration here may be resetting the first target duration to be itself, that is, the first target duration is updated to itself.

For example, step S205, step S206 and step S207 are specific implementations of updating the first target duration based on the amount of deviation between the first pose mapping and the second pose mapping. In an aspect, when the amount of deviation between the first pose mapping and the second pose mapping is less than the preset deviation threshold, it is indicated that a pose mapping change amount is small between the first time and the second time, that is, the terminal device is in a state of relatively stationary. In this case, the first target duration is updated to the second target duration greater than the first target duration, and the time interval at which the visual positioning service is called is increased, thereby reducing the computing load of the server. In addition, since the terminal device is in the state of relatively stationary, the accuracy of the output pose information does not significantly reduce. In another aspect, if the amount of deviation between the first pose mapping and the second pose mapping is greater than the deviation threshold, and the first target duration is greater than the preset duration threshold, it is indicated that the state of the terminal device is greatly changed and the first target duration can be further reduced, where the duration threshold is determined based on computing resources and network resources of the server. In this case, the first target duration is set and updated to the third target duration less than the first target duration, thereby shortening the interval at which the visual positioning service is called, and improving the accuracy of the output pose information while ensuring that resources of the server are sufficient and the server can operate normally. In yet another aspect, if the amount of deviation between the first pose mapping and the second pose mapping is greater than the deviation threshold, and the first target duration is less than or equal to the preset duration threshold, it is indicated that the state of the terminal device is greatly changed, but the first target duration cannot be further reduced. In this case, the first target duration is not changed, thereby preventing the visual positioning service from being called too frequently, and thus causing the server to be unable to operate normally.

In the steps of this embodiment, the first target duration is dynamically updated based on the amount of deviation between the first pose mapping and the second pose mapping, the first target duration and the duration threshold, such that a movement state of the terminal device dynamically matches the resources of the server, thereby improving the utilization rates of computing resources and network resources of the server, improving and ensuring the accuracy of the output pose information, and also ensuring that the server can operate normally.

Step S208: After the first target duration, obtain first pose information and second pose information of the terminal device at a third time, and obtain output pose information based on the first pose information and the second pose information.

After the first target duration is determined, a visual positioning service is performed again after the first target duration, and based on the obtained second pose information and real-time first pose information, the output pose information is generated, thereby providing a support for a real augmented reality application. Due to the dynamic update of the first target duration, the utilization rates of the computing resources and network resources of the server are increased, the accuracy of the output pose information is increased and ensured, and it is also ensured that the server can operate normally.

Figure 10:
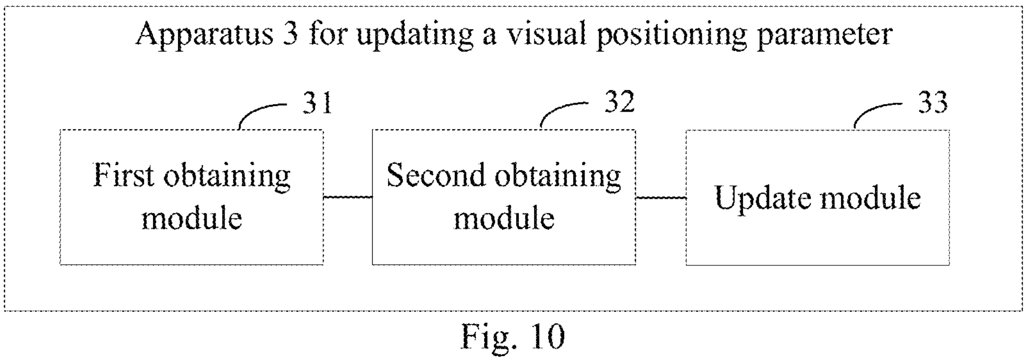
FIG. 10 is a block diagram of a structure of an apparatus for updating a visual positioning parameter according to an embodiment of the present disclosure.

Corresponding to the method for updating a visual positioning parameter in the above embodiments, FIG. 10 is a block diagram of a structure of an apparatus for updating a visual positioning parameter according to an embodiment of the present disclosure. For ease of illustration, only parts related to this embodiment of the present disclosure are shown. With reference to FIG. 10, an apparatus 3 for updating a visual positioning parameter includes:

a first obtaining module 31, which is configured to obtain a first pose mapping based on first pose information and second pose information of a terminal device at a first time, where the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device;

a second obtaining module 32, which is configured to obtain a first target duration based on a synchronization interval parameter, and after the first target duration, obtain a second pose mapping based on first pose information and second pose information of the terminal device at a second time, where the second pose mapping represents a mapping relationship between an estimated pose and an actual pose at the second time; and an update module 33, which is configured to update the synchronization interval parameter based on the amount of deviation between the first pose mapping and the second pose mapping, where the synchronization interval parameter is used for determining a time interval between two instances of visual positioning of the terminal device.

In an embodiment of the present disclosure, before the obtaining a first pose mapping based on first pose information and second pose information of the terminal device at a first time, the first obtaining module is further configured to: iteratively perform the following steps until the positioning success count reaches a preset value, where the preset value is an integer greater than 1: obtaining a camera image and running the real-time tracking algorithm based on the camera image, to obtain first pose information corresponding to the camera image; sending to the visual positioning service a positioning request including the camera image, where the positioning request is used for obtaining an actual pose of the terminal device that corresponds to the camera image; and if second pose information returned by the visual positioning service is received, updating the positioning success count, and storing the first pose information and the second pose information at the current time.

In an embodiment of the present disclosure, the first time includes at least a first sub-time and a second sub-time after the first sub-time, and the first obtaining module 31 is specifically configured to: obtain first positioning data based on first pose information and second pose information that correspond to a first sub-time; obtain second positioning data based on first pose information and second pose information that correspond to a second sub-time; and align the first positioning data with the second positioning data based on a similarity transformation algorithm, to obtain the first pose mapping.

In an embodiment of the present disclosure, the synchronization interval parameter includes the first target duration, and the update module 33 is specifically configured to: if the amount of deviation between the first pose mapping and the second pose mapping is less than a preset deviation threshold, update a first target duration to a second target duration, where the second target duration is greater than the first target duration; and if the amount of deviation between the first pose mapping and the second pose mapping is greater than the deviation threshold, update the first target duration to a third target duration, where the third target duration is less than or equal to the first target duration.

In an embodiment of the present disclosure, if the first target duration is greater than a preset duration threshold, the third target duration is less than the first target duration; and if the first target duration is less than or equal to the preset duration threshold, the third target duration is equal to the first target duration.

In an embodiment of the present disclosure, the first obtaining module 31 is further configured to: obtain first pose information of the terminal device at a third time; and superimpose the first pose mapping onto the first pose information of the terminal device at the third time to obtain the output pose information, where the output pose information represents a real-time pose of the terminal device which is obtained based on the real-time tracking algorithm and the visual positioning service at the third time.

In an embodiment of the present disclosure, the first pose mapping includes an attitude mapping and a size mapping, the attitude mapping includes a rotation attitude mapping and a translation distance mapping, and the first pose information includes a rotation attitude and a translation distance.

The first obtaining module 31, when superimposing the first pose mapping onto the first pose information of the terminal device at the third time to obtain the output pose information, is specifically configured to: obtain a rotation attitude output based on the product of the rotation attitude and the rotation attitude mapping; obtain a translation attitude output based on the sum of the translation distance mapping and the product of the size mapping, the attitude mapping and the translation distance; and obtain the output pose information based on the rotation attitude output and the translation attitude output.

The first obtaining module 31, the second obtaining module 32 and the update module 33 are connected in sequence. The apparatus 3 for updating a visual positioning parameter provided in this embodiment may perform the technical solution of the above method embodiment. The implementation principles and technical effects thereof are similar, which are not repeated in this embodiment.

Figure 11:
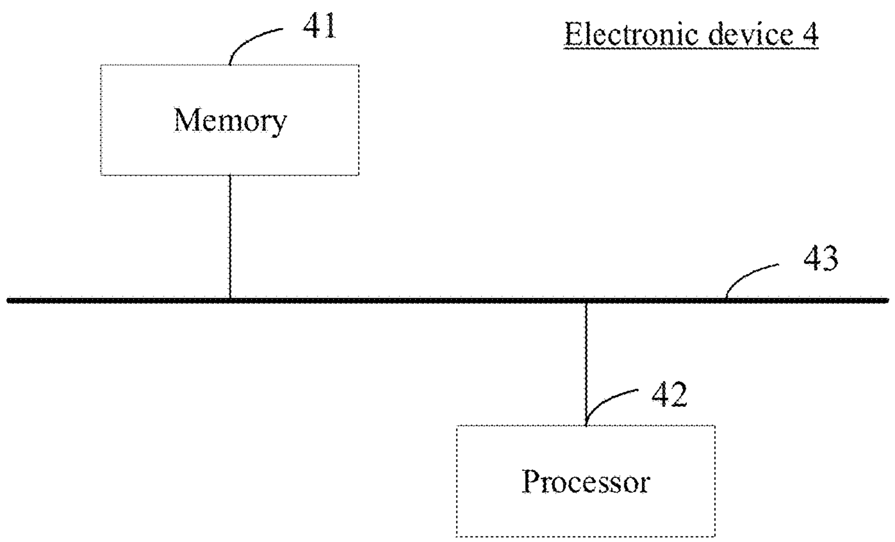
FIG. 11 is a schematic diagram of a structure of an electronic device according to an embodiment of the present disclosure.

FIG. 11 is a schematic diagram of a structure of an electronic device according to an embodiment of the present disclosure. As shown in FIG. 11, an electronic device 4 includes:

- a processor 41, and a memory 42 in communication connection with the processor 41, where
- the memory 42 stores computer-executable instructions; and
- the processor 41 executes the computer-executable instructions stored in the memory 42 to implement the method for updating a visual positioning parameter according to the embodiments as shown in FIGS. 3-9.

Optionally, the processor 41 and the memory 42 are connected through a bus 43.

The related description may be understood with reference to related description and effects that correspond to the steps in the embodiments corresponding to FIGS. 3-9. Details are not described herein again.

Figure 12:
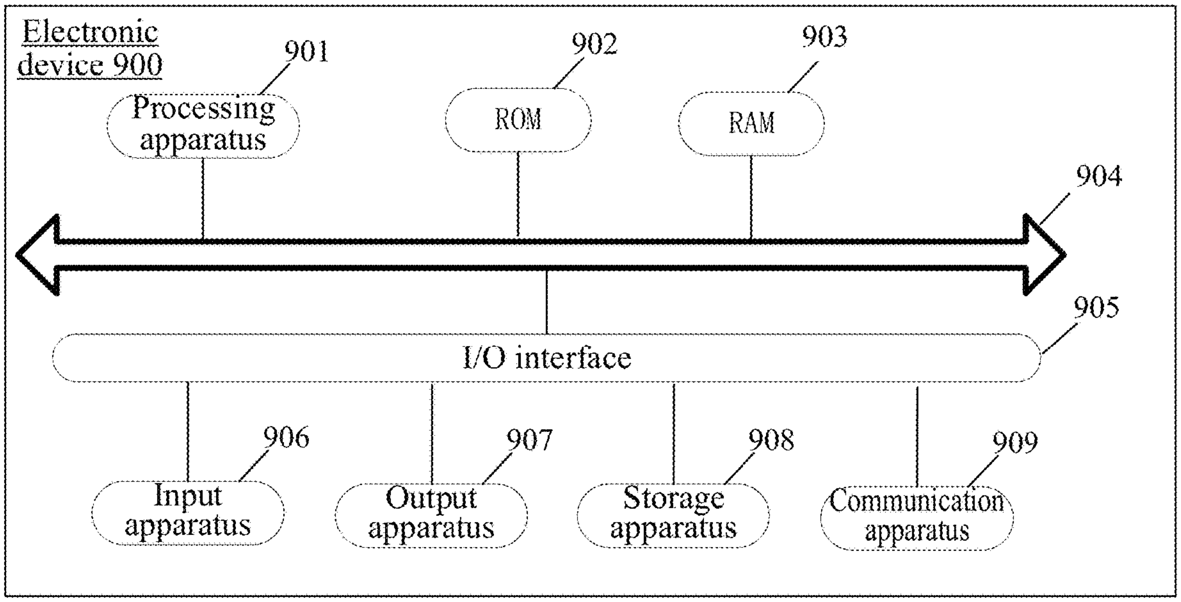
FIG. 12 is a schematic diagram of a hardware structure of an electronic device according to an embodiment of the present disclosure.

FIG. 12 is a schematic diagram of a structure of an electronic device 900 suitable for implementing the embodiments of the present disclosure. The electronic device 900 may be a terminal device or a server. The terminal device may include, but is not limited to, a mobile terminal such as a mobile phone, a notebook computer, a digital broadcast receiver, a personal digital assistant (PDA), a tablet computer (portable android device, PAD), a portable media player (PMP), and a vehicle-mounted terminal (such as a vehicle navigation terminal), and a fixed terminal such as a digital TV and a desktop computer. The electronic device shown in FIG. 12 is merely an example, and shall not impose any limitation on the function and scope of use of the embodiments of the present disclosure.

As shown in FIG. 12, the electronic device 900 may include a processing apparatus (e.g., a central processor, a graphics processor) 901 that may perform a variety of appropriate actions and processes in accordance with a program stored in a read-only memory (ROM) 902 or a program loaded from a storage apparatus 908 into a random access memory (RAM) 903. The RAM 903 further stores various programs and data required for the operation of the electronic device 900. The processing apparatus 901, the ROM 902, and the RAM 903 are connected to each other through a bus 904. An input/output (I/O) interface 905 is also connected to the bus 904.

Generally, the following apparatuses may be connected to the I/O interface 905: an input apparatus 906 including, for example, a touch screen, a touchpad, a keyboard, a mouse, a camera, a microphone, an accelerometer, and a gyroscope; an output apparatus 907 including, for example, a liquid crystal display (LCD), a speaker, and a vibrator; the storage apparatus 908 including, for example, a tape and a hard disk; and a communication apparatus 909. The communication apparatus 909 may allow the electronic device 900 to perform wireless or wired communication with other devices to exchange data. Although FIG. 12 shows the electronic device 900 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded from a network through the communication apparatus 909 and installed, installed from the storage apparatus 908, or installed from the ROM 902. When the computer program is executed by the processing apparatus 901, the above-mentioned functions defined in the method of the embodiment of the present disclosure are performed. This embodiment of the present disclosure further includes a computer program that, when executed by a processor, causes the above functions defined in the method according to the embodiments of the present disclosure to be implemented.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. However, in the present disclosure, the computer-readable signal medium may include a data signal propagated in a baseband or as a part of a carrier, where the data signal carries computer-readable program code. The propagated data signal may take various forms, including but not limited to an electromagnetic signal, an optical signal, or any suitable combination thereof. The computer-readable signal medium may also be any computer-readable medium other than the computer-readable storage medium. The computer-readable signal medium may send, propagate, or transmit a program used by or in combination with the instruction execution system, apparatus, or device. The program code contained in the computer-readable medium may be transmitted by any suitable medium, including but not limited to: an electric wire, an optical cable, radio frequency (RF), etc., or any suitable combination thereof.

The above computer-readable medium may be contained in the above electronic device. Alternatively, the computer-readable medium may exist separately, without being assembled into the electronic device.

The above computer-readable medium carries one or more programs that, when executed by the electronic device, cause the electronic device to perform the method shown in the above embodiment.

The computer program code for performing the operations in the present disclosure may be written in one or more programming languages or a combination thereof, where the programming languages include an object-oriented programming language, such as Java, Smalltalk, or C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user via any kind of network, including a local area network (LAN) or a wide area network (WAN), or may be connected to an external computer (for example, connected via the Internet with the aid of an Internet service provider).

The flowcharts and the block diagrams in the accompanying drawings illustrate the possible architecture, functions, and operations of the system, the method, and the computer program product according to the various embodiments of the present disclosure. In this regard, each block in the flowcharts or the block diagrams may represent a module, a program segment, or a part of code, and the module, the program segment, or the part of code includes one or more executable instructions for implementing specified logic functions. It should also be noted that, in some alternative implementations, the functions indicated in the blocks may also occur in a different order than indicated in the accompanying drawings. For example, two blocks shown in succession may actually be performed substantially in parallel, or may sometimes be performed in a reverse order, depending on the functions involved. It should also be noted that each block in the block diagrams and/or the flowcharts, and a combination of the blocks in the block diagrams and/or the flowcharts may be implemented by using a dedicated hardware-based system that executes specified functions or operations, or may be implemented by using a combination of dedicated hardware and computer instructions.

The involved units described in the embodiments of the present disclosure may be implemented through software or hardware. Names of the units do not constitute a limitation on the units themselves in some cases, for example, a first obtaining unit may alternatively be described as "a unit for obtaining at least two Internet Protocol addresses".

The functions described herein above may be performed at least partially by one or more hardware logic components. For example, without limitation, exemplary types of hardware logic components that may be used include: a field-programmable gate array (FPGA), an application-specific integrated circuit (ASIC), application-specific standard parts (ASSP), a system-on-chip (SOC) system, a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above content.

In a first aspect, according to one or more embodiments of the present disclosure, a method for updating a visual positioning parameter is provided. The method is applied to a terminal device, and includes:

obtaining a first pose mapping based on first pose information and second pose information of the terminal device at a first time, where the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device; obtaining a first target duration based on a synchronization interval parameter, and after the first target duration, obtaining a second pose mapping based on first pose information and second pose information of the terminal device at a second time, where the second pose mapping represents a mapping relationship between an estimated pose and an actual pose at the second time; and updating the synchronization interval parameter based on the amount of deviation between the first pose mapping and the second pose mapping, where the synchronization interval parameter is used for determining a time interval between two instances of visual positioning of the terminal device.

According to one or more embodiments of the present disclosure, before the obtaining a first pose mapping based on first pose information and second pose information of the terminal device at a first time, the method further includes: iteratively performing the following steps until the positioning success count reaches a preset value, where the preset value is an integer greater than 1: obtaining a camera image and running the real-time tracking algorithm based on the camera image, to obtain first pose information corresponding to the camera image; sending to the visual positioning service a positioning request including the camera image, where the positioning request is used for obtaining an actual pose of the terminal device that corresponds to the camera image; and if second pose information returned by the visual positioning service is received, updating the positioning success count, and storing the first pose information and the second pose information at the current time.

According to one or more embodiments of the present disclosure, the first time includes at least a first sub-time and a second sub-time after the first sub-time, and the obtaining a first pose mapping based on first pose information and second pose information of the terminal device at a first time includes: obtaining first positioning data based on first pose information and second pose information that correspond to the first sub-time; obtaining second positioning data based on first pose information and second pose information that correspond to the second sub-time; and aligning the first positioning data with the second positioning data based on a similarity transformation algorithm, to obtain the first pose mapping.

According to one or more embodiments of the present disclosure, the synchronization interval parameter includes the first target duration, and the updating the synchronization interval parameter based on the amount of deviation between the first pose mapping and the second pose mapping includes: if the amount of deviation between the first pose mapping and the second pose mapping is less than a preset deviation threshold, updating the first target duration to a second target duration, where the second target duration is greater than the first target duration; and if the amount of deviation between the first pose mapping and the second pose mapping is greater than the deviation threshold, updating the first target duration to a third target duration, where the third target duration is less than or equal to the first target duration.

According to one or more embodiments of the present disclosure, if the first target duration is greater than a preset duration threshold, the third target duration is less than the first target duration; and if the first target duration is less than or equal to the preset duration threshold, the third target duration is equal to the first target duration.

According to one or more embodiments of the present disclosure, the method further includes: obtaining first pose information of the terminal device at a third time; and superimposing the first pose mapping onto the first pose information of the terminal device at the third time to obtain output pose information, where the output pose information represents a real-time pose of the terminal device which is obtained based on the real-time tracking algorithm and the visual positioning service at the third time.

According to one or more embodiments of the present disclosure, the first pose mapping includes an attitude mapping and a size mapping, the attitude mapping includes a rotation attitude mapping and a translation distance mapping, and the first pose information includes a rotation attitude and a translation distance; and the superimposing the first pose mapping onto the first pose information of the terminal device at the third time to obtain output pose information includes: obtaining a rotation attitude output based on the product of the rotation attitude and the rotation attitude mapping; obtaining a translation attitude output based on the sum of the translation distance mapping and the product of the size mapping, the attitude mapping and the translation distance; and obtaining the output pose information based on the rotation attitude output and the translation attitude output.

During the process of continuous visual positioning, a deviation comparison is made based on a first pose mapping obtained during the process of first visual positioning and a second pose mapping obtained during the process of second visual positioning, and a synchronization interval parameter that represents a time interval between the two instances of visual positioning is updated based on an obtained amount of deviation, such that the synchronization interval parameters is dynamically adjusted. In the case of different amounts of deviation, different time intervals are used to call the visual positioning service, thereby avoiding the problems of high computing load and high network load of the server caused by excessively frequent calling of the visual positioning service, and improving the real-time responsiveness and the stability of the visual positioning service.

In a second aspect, according to one or more embodiments of the present disclosure, an apparatus for updating a visual positioning parameter is provided. The apparatus is applied to a terminal device, and includes:

a first obtaining module, which is configured to obtain a first pose mapping based on first pose information and second pose information of the terminal device at a first time, where the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device;

a second obtaining module, which is configured to obtain a first target duration based on a synchronization interval parameter, and after the first target duration, obtain a second pose mapping based on first pose information and second pose information of the terminal device at a second time, where the second pose mapping represents a mapping relationship between an estimated pose and an actual pose at the second time; and an update module, which is configured to update the synchronization interval parameter based on the amount of deviation between the first pose mapping and the second pose mapping, where the synchronization interval parameter is used for determining a time interval between two instances of visual positioning of the terminal device.

According to one or more embodiments of the present disclosure, before the obtaining a first pose mapping based on first pose information and second pose information of the terminal device at a first time, the first obtaining module is further configured to: iteratively perform the following steps until the positioning success count reaches a preset value, where the preset value is an integer greater than 1: obtaining a camera image and running the real-time tracking algorithm based on the camera image, to obtain first pose information corresponding to the camera image; sending to the visual positioning service a positioning request including the camera image, where the positioning request is used for obtaining an actual pose of the terminal device that corresponds to the camera image; and if second pose information returned by the visual positioning service is received, updating the positioning success count, and storing the first pose information and the second pose information at the current time.

According to one or more embodiments of the present disclosure, the first time includes at least a first sub-time and a second sub-time after the first sub-time, and the first obtaining module is specifically configured to: obtain first positioning data based on first pose information and second pose information that correspond to a first sub-time; obtain second positioning data based on first pose information and second pose information that correspond to a second sub-time; and align the first positioning data with the second positioning data based on a similarity transformation algorithm, to obtain the first pose mapping.

According to one or more embodiments of the present disclosure, the synchronization interval parameter includes the first target duration, and the update module is specifically configured to: if the amount of deviation between a first pose mapping and a second pose mapping is less than a preset deviation threshold, update a first target duration to a second target duration, where the second target duration is greater than the first target duration; and if the amount of deviation between the first pose mapping and the second pose mapping is greater than the deviation threshold, update the first target duration to a third target duration, where the third target duration is less than or equal to the first target duration.

According to one or more embodiments of the present disclosure, if the first target duration is greater than a preset duration threshold, the third target duration is less than the first target duration; and if the first target duration is less than or equal to the preset duration threshold, the third target duration is equal to the first target duration.

According to one or more embodiments of the present disclosure, the first obtaining module is further configured to: obtain first pose information of the terminal device at a third time; and superimpose the first pose mapping onto the first pose information of the terminal device at the third time to obtain the output pose information, where the output pose information represents a real-time pose of the terminal device which is obtained based on the real-time tracking algorithm and the visual positioning service at the third time.

According to one or more embodiments of the present disclosure, the first pose mapping includes an attitude mapping and a size mapping, the attitude mapping includes a rotation attitude mapping and a translation distance mapping, and the first pose information includes a rotation attitude and a translation distance. The first obtaining module, when superimposing the first pose mapping onto the first pose information of the terminal device at the third time to obtain the output pose information, is specifically configured to: obtain a rotation attitude output based on the product of the rotation attitude and the rotation attitude mapping; obtain a translation attitude output based on the sum of the translation distance mapping and the product of the size mapping, the attitude mapping and the translation distance; and obtain the output pose information based on the rotation attitude output and the translation attitude output.

In a third aspect, according to one or more embodiments of the present disclosure, an electronic device is provided. The electronic device includes: a processor, and a memory in communication connection with the processor, where the memory stores computer-executable instructions; and the processor executes the computer-executable instructions stored in the memory to implement the method for updating a visual positioning parameter as described in the first aspect and various possible designs of the first aspect.

In a fourth aspect, according to one or more embodiments of the present disclosure, a computer-readable storage medium is provided. The computer-readable storage medium stores computer-executable instructions that, when executed by a processor, cause the method for updating a visual positioning parameter as described in the first aspect and various possible designs of the first aspect to be implemented.

In a fifth aspect, an embodiment of the present disclosure provides a computer program product including a computer program that, when executed by a processor, causes the method for updating a visual positioning parameter as described in the first aspect and various possible designs of the first aspect to be implemented.

In a sixth aspect, an embodiment of the present disclosure provides a computer program that, when executed by a processor, causes the method for updating a visual positioning parameter as described in the first aspect and various possible designs of the first aspect to be implemented.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing disclosed concept, such as a technical solution formed by replacing the foregoing features with the technical features with similar functions disclosed (but not limited to) in the present disclosure.

In addition, although the various operations are depicted in a specific order, this should not be construed as requiring that these operations be performed in the specific order shown or in a sequential order. Under certain circumstances, multitasking and parallel processing may be advantageous. Similarly, although a number of specific implementation details are included in the foregoing discussions, these details should not be construed as limiting the scope of the present disclosure. Some features that are described in the context of separate embodiments may also be implemented in combination in one single embodiment. In contrast, various features described in the context of one single embodiment may alternatively be implemented in a plurality of embodiments separately or in any suitable subcombination.

Although the subject matter has been described with reference to specific structural features and/or logic actions of the method, it should be understood that the subject matter defined in the appended claims is not necessarily limited to the specific features or actions described above. In contrast, the specific features and actions described above are merely exemplary implementations of the subject matter defined in the claims.

The invention claimed is:

1. A method for updating a visual positioning parameter, wherein the method is applied to a terminal device, and comprises:

obtaining a first pose mapping based on first pose information and second pose information of the terminal device at a first time, wherein the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device;

obtaining a first target duration based on a synchronization interval parameter, and after the first target duration, obtaining a second pose mapping based on first pose information and second pose information of the terminal device at a second time, wherein the second pose mapping represents a mapping relationship between an estimated pose and an actual pose at the second time; and updating the synchronization interval parameter based on the amount of deviation between the first pose mapping and the second pose mapping, wherein the synchronization interval parameter is used for determining a time interval between two instances of visual positioning of the terminal device.

2. The method according to claim 1, wherein before the obtaining a first pose mapping based on first pose information and second pose information of the terminal device at a first time, the method further comprises:

iteratively performing the following steps until a positioning success count reaches a preset value, wherein the preset value is an integer greater than 1:

obtaining a camera image and running the real-time tracking algorithm based on the camera image, to obtain first pose information corresponding to the camera image;

sending to the visual positioning service a positioning request comprising the camera image, wherein the positioning request is used for obtaining an actual pose of the terminal device that corresponds to the camera image; and in response to second pose information returned by the visual positioning service being received, updating the positioning success count, and storing the first pose information and the second pose information at the current time.

3. The method according to claim 1, wherein the first time comprises at least a first sub-time and a second sub-time after the first sub-time, and the obtaining a first pose mapping based on first pose information and second pose information of the terminal device at a first time comprises:

obtaining first positioning data based on first pose information and second pose information that correspond to the first sub-time;

obtaining second positioning data based on first pose information and second pose information that correspond to the second sub-time; and aligning the first positioning data with the second positioning data based on a similarity transformation algorithm, to obtain the first pose mapping.

4. The method according to claim 1, wherein the synchronization interval parameter comprises the first target duration, and the updating the synchronization interval parameter based on the amount of deviation between the first pose mapping and the second pose mapping comprises:

in response to the amount of deviation between the first pose mapping and the second pose mapping being less than a preset deviation threshold, updating the first target duration to a second target duration, wherein the second target duration is greater than the first target duration; and in response to the amount of deviation between the first pose mapping and the second pose mapping being greater than the deviation threshold, updating the first target duration to a third target duration, wherein the third target duration is less than or equal to the first target duration.

5. The method according to claim 4, wherein in response to the first target duration is greater than a preset duration threshold, the third target duration being less than the first target duration; and in response to the first target duration is less than or equal to the preset duration threshold, the third target duration being equal to the first target duration.

6. The method according to claim 1, further comprising:

obtaining first pose information of the terminal device at a third time; and superimposing the first pose mapping onto the first pose information of the terminal device at the third time to obtain output pose information, wherein the output pose information represents a real-time pose of the terminal device which is obtained based on the real-time tracking algorithm and the visual positioning service at the third time.

7. The method according to claim 6, wherein the first pose mapping comprises an attitude mapping and a size mapping, the attitude mapping comprises a rotation attitude mapping and a translation distance mapping, and the first pose information comprises a rotation attitude and a translation distance; and the superimposing the first pose mapping onto the first pose information of the terminal device at the third time to obtain output pose information comprises:

obtaining a rotation attitude output based on a product of the rotation attitude and the rotation attitude mapping;

obtaining a translation attitude output based on the sum of the translation distance mapping and a product of the size mapping, the attitude mapping and the translation distance; and obtaining the output pose information based on the rotation attitude output and the translation attitude output.

8. An electronic device, comprising: at least one processor, and at least one memory in communication connection with the at least one processor, wherein the at least one memory stores computer-executable instructions; and the at least one processor executes the computer-executable instructions stored in the at least one memory to implement a method for updating a visual positioning parameter, wherein the method is applied to a terminal device and comprises:

obtaining a first pose mapping based on first pose information and second pose information of the terminal device at a first time, wherein the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device;

obtaining a first target duration based on a synchronization interval parameter, and after the first target duration, obtaining a second pose mapping based on first pose information and second pose information of the terminal device at a second time, wherein the second pose mapping represents a mapping relationship between an estimated pose and an actual pose at the second time; and updating the synchronization interval parameter based on the amount of deviation between the first pose mapping and the second pose mapping, wherein the synchronization interval parameter is used for determining a time interval between two instances of visual positioning of the terminal device.

9. The electronic device according to claim 8, wherein before the obtaining a first pose mapping based on first pose information and second pose information of the terminal device at a first time, the method further comprises:

iteratively performing the following steps until a positioning success count reaches a preset value, wherein the preset value is an integer greater than 1:

obtaining a camera image and running the real-time tracking algorithm based on the camera image, to obtain first pose information corresponding to the camera image;

sending to the visual positioning service a positioning request comprising the camera image, wherein the positioning request is used for obtaining an actual pose of the terminal device that corresponds to the camera image; and in response to second pose information returned by the visual positioning service being received, updating the positioning success count, and storing the first pose information and the second pose information at the current time.

10. The electronic device according to claim 8, wherein the first time comprises at least a first sub-time and a second sub-time after the first sub-time, and the obtaining a first pose mapping based on first pose information and second pose information of the terminal device at a first time comprises:

obtaining first positioning data based on first pose information and second pose information that correspond to the first sub-time;

obtaining second positioning data based on first pose information and second pose information that correspond to the second sub-time; and aligning the first positioning data with the second positioning data based on a similarity transformation algorithm, to obtain the first pose mapping.

11. The electronic device according to claim 8, wherein the synchronization interval parameter comprises the first target duration, and the updating the synchronization interval parameter based on the amount of deviation between the first pose mapping and the second pose mapping comprises:

in response to the amount of deviation between the first pose mapping and the second pose mapping being less than a preset deviation threshold, updating the first target duration to a second target duration, wherein the second target duration is greater than the first target duration; and in response to the amount of deviation between the first pose mapping and the second pose mapping being greater than the deviation threshold, updating the first target duration to a third target duration, wherein the third target duration is less than or equal to the first target duration.

12. The electronic device according to claim 11, wherein in response to the first target duration is greater than a preset duration threshold, the third target duration being less than the first target duration; and in response to the first target duration is less than or equal to the preset duration threshold, the third target duration being equal to the first target duration.

13. The electronic device according to claim 8, wherein the method further comprises:

obtaining first pose information of the terminal device at a third time; and superimposing the first pose mapping onto the first pose information of the terminal device at the third time to obtain output pose information, wherein the output pose information represents a real-time pose of the terminal device which is obtained based on the real-time tracking algorithm and the visual positioning service at the third time.

14. The electronic device according to claim 13, wherein the first pose mapping comprises an attitude mapping and a size mapping, the attitude mapping comprises a rotation attitude mapping and a translation distance mapping, and the first pose information comprises a rotation attitude and a translation distance; and the superimposing the first pose mapping onto the first pose information of the terminal device at the third time to obtain output pose information comprises:

obtaining a rotation attitude output based on a product of the rotation attitude and the rotation attitude mapping;

obtaining a translation attitude output based on the sum of the translation distance mapping and a product of the size mapping, the attitude mapping and the translation distance; and obtaining the output pose information based on the rotation attitude output and the translation attitude output.

15. A non-transitory computer-readable storage medium, wherein the non-transitory computer-readable storage medium stores computer-executable instructions that, when executed by a processor, cause a method for updating a visual positioning parameter to be implemented, wherein the method is applied to a terminal device and comprises:

obtaining a first pose mapping based on first pose information and second pose information of the terminal device at a first time, wherein the first pose information represents an estimated pose of the terminal device which is obtained based on a real-time tracking algorithm, the second pose information represents an actual pose of the terminal device which is obtained based on a visual positioning service, the first pose mapping represents a mapping relationship between the estimated pose and the actual pose at the first time, and the mapping relationship between the estimated pose and the actual pose is used for implementing visual positioning of the terminal device;

obtaining a first target duration based on a synchronization interval parameter, and after the first target duration, obtaining a second pose mapping based on first pose information and second pose information of the terminal device at a second time, wherein the second pose mapping represents a mapping relationship between an estimated pose and an actual pose at the second time; and updating the synchronization interval parameter based on the amount of deviation between the first pose mapping and the second pose mapping, wherein the synchronization interval parameter is used for determining a time interval between two instances of visual positioning of the terminal device.

16. The non-transitory computer-readable storage medium according to claim 15, wherein before the obtaining a first pose mapping based on first pose information and second pose information of the terminal device at a first time, the method further comprises:

iteratively performing the following steps until a positioning success count reaches a preset value, wherein the preset value is an integer greater than 1:

obtaining a camera image and running the real-time tracking algorithm based on the camera image, to obtain first pose information corresponding to the camera image;

sending to the visual positioning service a positioning request comprising the camera image, wherein the positioning request is used for obtaining an actual pose of the terminal device that corresponds to the camera image; and in response to second pose information returned by the visual positioning service being received, updating the positioning success count, and storing the first pose information and the second pose information at the current time.

17. The non-transitory computer-readable storage medium according to claim 15, wherein the first time comprises at least a first sub-time and a second sub-time after the first sub-time, and the obtaining a first pose mapping based on first pose information and second pose information of the terminal device at a first time comprises:

obtaining first positioning data based on first pose information and second pose information that correspond to the first sub-time;

obtaining second positioning data based on first pose information and second pose information that correspond to the second sub-time; and aligning the first positioning data with the second positioning data based on a similarity transformation algorithm, to obtain the first pose mapping.

18. The non-transitory computer-readable storage medium according to claim 15, wherein the synchronization interval parameter comprises the first target duration, and the updating the synchronization interval parameter based on the amount of deviation between the first pose mapping and the second pose mapping comprises:

in response to the amount of deviation between the first pose mapping and the second pose mapping being less than a preset deviation threshold, updating the first target duration to a second target duration, wherein the second target duration is greater than the first target duration; and in response to the amount of deviation between the first pose mapping and the second pose mapping being greater than the deviation threshold, updating the first target duration to a third target duration, wherein the third target duration is less than or equal to the first target duration.

19. The non-transitory computer-readable storage medium according to claim 18, wherein in response to the first target duration is greater than a preset duration threshold, the third target duration being less than the first target duration; and in response to the first target duration is less than or equal to the preset duration threshold, the third target duration being equal to the first target duration.

20. The non-transitory computer-readable storage medium according to claim 15, wherein the method further comprises:

obtaining first pose information of the terminal device at a third time; and superimposing the first pose mapping onto the first pose information of the terminal device at the third time to obtain output pose information, wherein the output pose information represents a real-time pose of the terminal device which is obtained based on the real-time tracking algorithm and the visual positioning service at the third time.

* * * * *